(12) United States Patent
Stokes

(10) Patent No.: US 10,496,527 B2
(45) Date of Patent: Dec. 3, 2019

(54) SYSTEM AND METHOD FOR RAPID AND REPEATABLE PROVISIONING AND REGRESSION TESTING PLANS

(71) Applicant: Belay Technologies, Inc., Columbia, MD (US)

(72) Inventor: Jacob Stokes, Edgewater, MD (US)

(73) Assignee: Belay Technologies, Inc., Columbia, MD (US)

( * ) Notice: Subject to any disclaimer, the term of this patent is extended or adjusted under 35 U.S.C. 154(b) by 0 days.

(21) Appl. No.: 16/044,156

(22) Filed: Jul. 24, 2018

(65) Prior Publication Data

US 2019/0034320 A1    Jan. 31, 2019

Related U.S. Application Data

(60) Provisional application No. 62/536,818, filed on Jul. 25, 2017.

(51) Int. Cl.
 *G06F 9/44*  (2018.01)
 *G06F 11/28* (2006.01)
 (Continued)

(52) U.S. Cl.
 CPC ............ *G06F 11/3664* (2013.01); *G06F 8/61* (2013.01); *G06F 9/45558* (2013.01);
 (Continued)

(58) Field of Classification Search
 CPC ............ G06F 11/3688; G06F 11/3616; G06F 11/3664; G06F 11/3672; G06F 11/368;
 (Continued)

(56) References Cited

U.S. PATENT DOCUMENTS 6,523,027 B1 * 2/2003 Underwood ............ G06F 9/465
6,601,233 B1 * 7/2003 Underwood ............. G06F 8/24
717/100

(Continued)

OTHER PUBLICATIONS

Teresa Guarda et al., Penetration Testing on Virtual Environments, Dec. 28-31, 2016, [Retrieved on Oct. 8, 2019]. Retrieved from the internet: <URL: https://dl.acm.org/citation.cfm?id=3026728> 4 Pages (9-12) (Year: 2016).*

(Continued)

*Primary Examiner* — Anibal Rivera
(74) *Attorney, Agent, or Firm* — Offit Kurman

(57) ABSTRACT

Disclosed is a system and method for supervised, systematic and reproducible utilization of one or more virtual machines to provide a deployable and flexible suite of testing environments that cover the expected range of real-world deployments of software applications in a simulation of their current and anticipated real-world environments. The setup, configuration and results generated by the virtual machines is recorded and may be replicated to provide freshly instantiated but identically configured environments or changed and updated environments for forward and regression testing of applications. Virtual environments may be updated with successive OS and application revisions. Addition of new configurations is simplified to allow extensibility to new and evolving platforms without developing new software or scripts. Test results are tagged and documented and are reproducible by instantiating the environments and applications used as stored in a database. The system allows side-by-side comparisons of multiple test results for regression testing capabilities.

3 Claims, 15 Drawing Sheets

(51) Int. Cl.
G06F 9/455 (2018.01)
G06F 11/36 (2006.01)
G06F 8/61 (2018.01)
G06F 9/54 (2006.01)

(52) U.S. Cl.
CPC .......... G06F 9/546 (2013.01); G06F 11/3688 (2013.01); G06F 11/3692 (2013.01)

(58) Field of Classification Search
CPC ...... G06F 9/455; G06F 9/465; G06F 9/45558; G06F 9/5044; G06F 8/24; G06F 8/71; G06F 8/658; G06F 3/0484; G06F 16/2246; G06F 9/5072
See application file for complete search history.

(56) References Cited

U.S. PATENT DOCUMENTS

| | | | | |
|---|---|---|---|---|
| 7,000,224 | B1* | 2/2006 | Osborne, II | G06F 11/3688 714/738 |
| 9,032,373 | B1* | 5/2015 | Gupta | G06F 11/3688 717/127 |
| 9,110,496 | B1* | 8/2015 | Michelsen | G06F 1/00 |
| 9,292,350 | B1* | 3/2016 | Pendharkar | G06F 9/5044 |
| 9,405,665 | B1* | 8/2016 | Shashi | G06F 16/2246 |
| 9,426,030 | B1* | 8/2016 | Anerousis | H04L 41/0859 |
| 9,531,801 | B1* | 12/2016 | Cantrell | H04L 67/104 |
| 2004/0103394 | A1* | 5/2004 | Manda | G06F 11/3688 717/126 |
| 2011/0004676 | A1* | 1/2011 | Kawato | G06F 9/5044 709/221 |
| 2011/0231825 | A1* | 9/2011 | Grechanik | G06F 11/368 717/126 |
| 2012/0110572 | A1* | 5/2012 | Kodi | G06F 9/45558 718/1 |
| 2014/0075242 | A1* | 3/2014 | Dolinina | G06F 11/3672 714/27 |
| 2015/0058460 | A1* | 2/2015 | Seago | H04L 63/102 709/223 |
| 2016/0232457 | A1* | 8/2016 | Gray | G06T 11/206 |
| 2016/0335113 | A1* | 11/2016 | Gorst | G06F 9/45558 |
| 2017/0060621 | A1* | 3/2017 | Whipple | G06F 9/5072 |
| 2017/0060730 | A1* | 3/2017 | Li | G06F 11/3616 |
| 2017/0139738 | A1* | 5/2017 | Kim | G06F 9/45558 |
| 2017/0153906 | A1* | 6/2017 | Bektas | G06F 9/45558 |
| 2017/0170990 | A1* | 6/2017 | Gaddehosur | H04L 12/4675 |
| 2017/0192873 | A1* | 7/2017 | Ozdemir | G06F 8/658 |
| 2017/0277374 | A1* | 9/2017 | Ozcan | G06F 3/0484 |
| 2018/0341573 | A1* | 11/2018 | Patel | G06F 11/3664 |

OTHER PUBLICATIONS

Diego Perez-Botero et al., Characterizing hypervisor vulnerabilities in cloud computing servers, May 8, 2013, [Retrieved on Oct. 8, 2019]. Retrieved from the internet: <URL: https://dl.acm.org/citation.cfm?id=2484406> 8 Pages (3-10) (Year: 2013).*

* cited by examiner

SYSTEM AND METHOD FOR RAPID AND REPEATABLE PROVISIONING AND REGRESSION TESTING PLANS

CROSS-REFERENCE TO RELATED APPLICATIONS

This application claims benefit to U.S. Provisional Appl. No. 62/536,818, filed on Jul. 25, 2017, the contents of which are hereby incorporated by reference in their entirety.

STATEMENT REGARDING FEDERALLY SPONSORED RESEARCH AND DEVELOPMENT

This invention was made without federal government support.

BACKGROUND OF THE INVENTION

Currently, there is lacking an integrated and automated provisioning and regression testing system for information technology and software deliverables and software applications. While limited-capability software testing applications exist, they do so in isolation and are not integrated with provisioning. Further, existing tools and solutions do not combine robust and extensive provisioning with comprehensive testing functionalities simultaneously. Additionally, existing tools do not have the capability to configure and test against multiple operating systems (OS), applications and devices.

BRIEF SUMMARY OF THE INVENTION

The present invention provides an extremely adaptable and automated testing environment utilizing virtual machines (VMs) and logic that can perform intelligent tasks to promote the full testing cycle repeatedly and cleanly.

A VM is known to those of ordinary skill in the art and consists of software that is designed to mimic the performance of a hardware device, or even mimic a "complete" computer. A VM functions as a computer platform that hides the OS of the underlying hardware computer from applications written in the programming language of the VM. VMs are commonly associated with stand-alone or client-side computers, where the VM operates in conjunction with an OS or an Internet browser, or in conjunction with or on a server that serves one or more client computers. The clients may be connected to the server directly or by networked connections. Server VMs may be used in a variety of applications, including database and transaction applications.

The present invention is an automated provisioning and regression testing framework that utilizes VMs and a variety of technologies and components in a unique and logical fashion to achieve the goal of executing rapid, repeatable provisioning and regression testing plans, for limitless OS, patches, browsers, and applications on desktop and mobile devices. The present invention provides a system and method for software application testing that dramatically reduces the testing period, minimizes the potential for human error and is reproducible and repeatable, all while ensuring every test is conducted in a new virtual environment with no residual software artifacts remaining from previous tests. The present invention includes extensive audit trails generated throughout each test, which include screen shots and log files that allow for review of issues and permit the process to revert to a "clean state".

The present invention is browser and language agnostic, whereas known testing methods are strictly limited by browser compatibility. The present invention is configured for testing non-browser based web graphical user interfaces (GUIs), like thick clients, Adobe Acrobat and Microsoft® Office products, and is configured to conduct testing on the OS of mobile devices and tablets. The present invention provides a clean and isolated test environment by utilizing virtualization.

In one embodiment, a system is provided and configured for provisioning a VM environment and additional software installations, executing a test plan and providing results to a user, accessible via a system GUI.

DETAILED DESCRIPTION OF THE INVENTION

Described herein is a computer-implemented system and method for provisioning and regression testing of software packages, GUIs and applications on a VM configuration of virtualized Windows®, Linux, Android and mobile OS, among others. The system and method described herein is configured for rapid-cycle development and testing, is browser and language agnostic, and is scalable.

The system and method described herein comprises a framework architecture configured for seamless integration of multiple capabilities through one or more logical agents utilizing interfaces independent of the specific nature of the capability hidden behind them; new capabilities can be added and existing ones updated with minimal disturbance.

Figure 1:
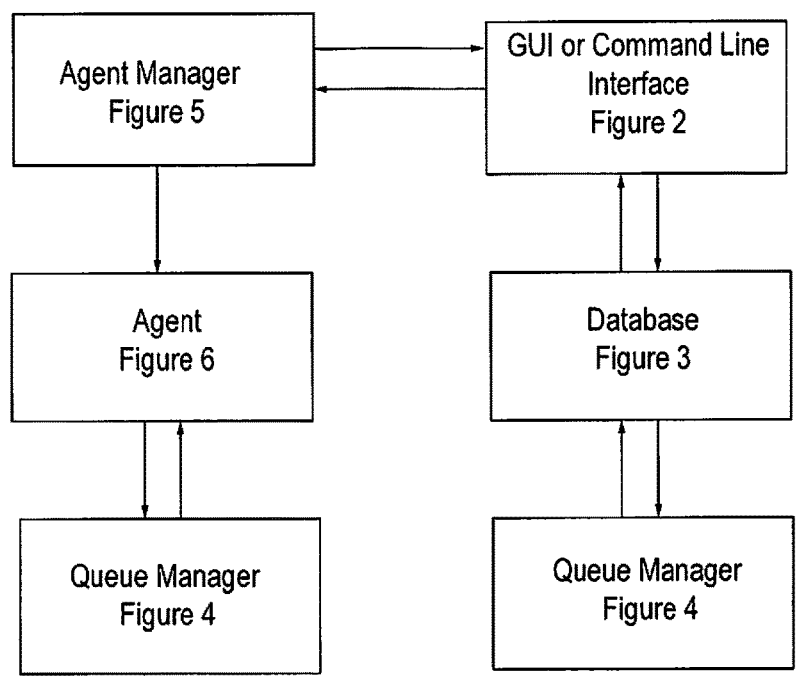
FIG. 1 provides the most basic overview of the modules (queue manager, agent manager and agent) of the present invention, along with the user interface (GUI or command line interface) and database. The user defines test parameters at the user interface.
Figure 2:
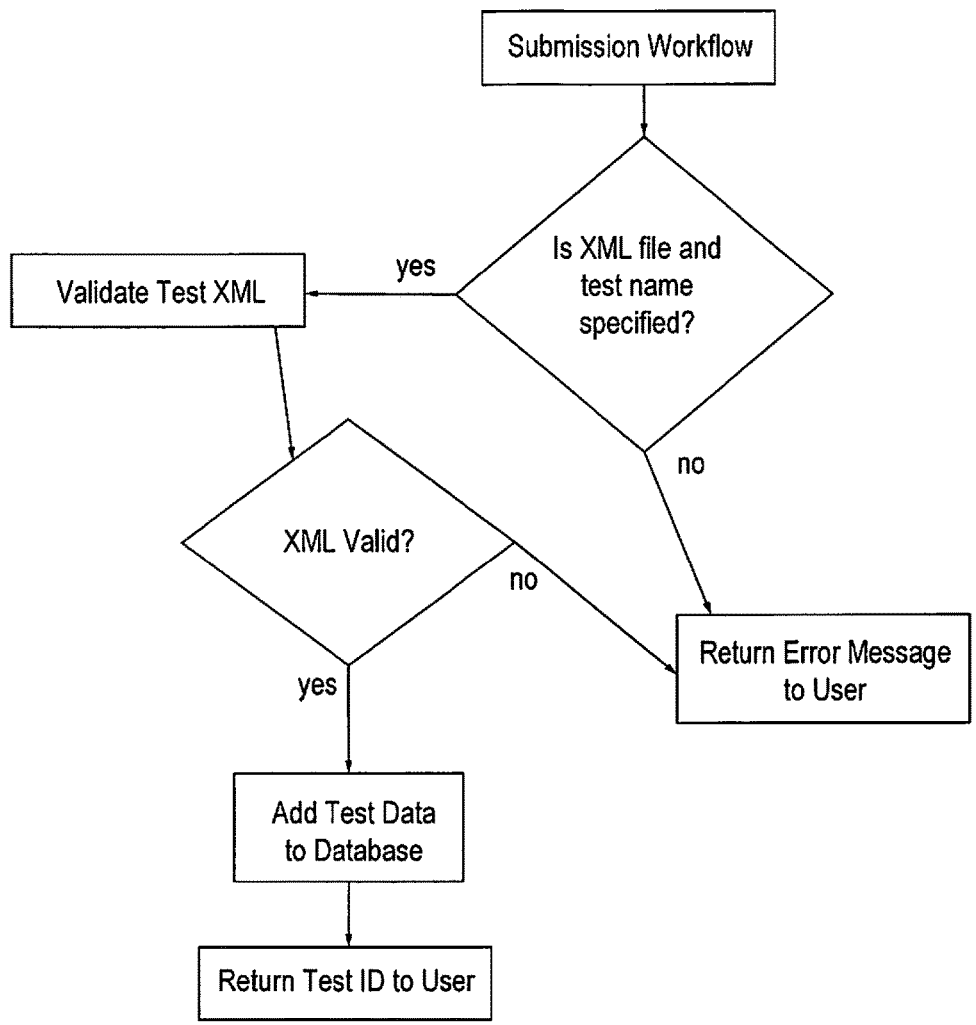
FIG. 2 shows an overview of how a user-defined workflow is submitted and validated. A submitted Extensible Markup Language (XML) file name and test name are specified and validated before the system will add the test data to the database and return a unique "Test ID" to the user.

The most basic foundational components of the invention described herein are depicted at FIG. 1, consisting of a database and three modules—the queue manager, agent manager and agent—that reside on one or more servers and are configured for communication with one another. The user interface (GUI or Command Line Interface) allows the user to specify the parameters and requirements of the test cases to perform and the ability to submit test plans to the database (as depicted in FIG. 2), which stores all the information and metadata that the various components rely on to make "decisions" for executing test plans. The queue manager runs independently of other components and relies on the information available in the database to assign the appropriate resources and manage timing of submitted test plans. One or more agent managers will utilize the information provided by the database to initiate performance of the test workflow by an agent on a designated hypervisor (VM monitor). The agent only exists once it is assigned a workflow, which cannot occur until the test information has been validated. The agent will create the VM test environment and oversee the provisioning and configuration based on the test plan specifications.

Figure 3:
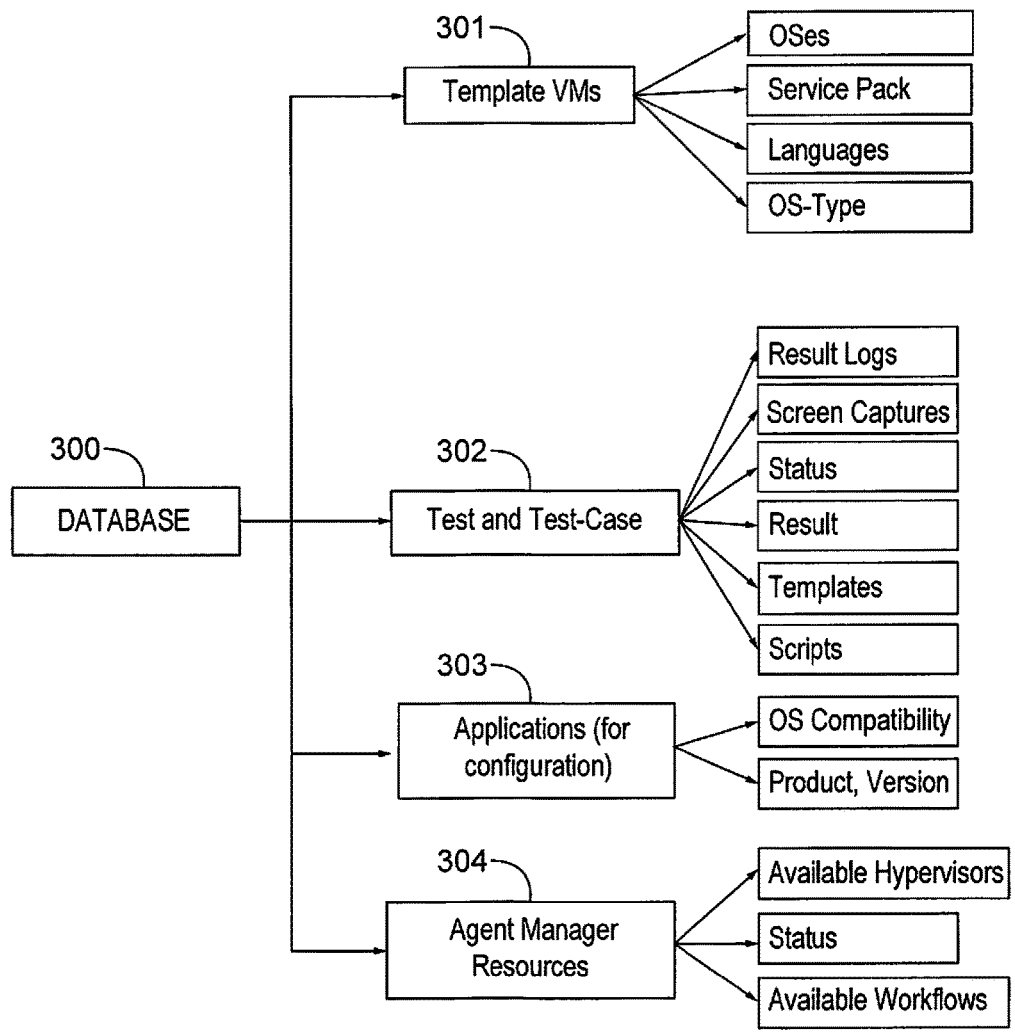
FIG. 3 overviews the database 300 and exemplary data stored thereon, including template VMs 301, test and test case information 302, application information 303 and agent manager resource information 304.

The database, as shown in FIG. 3, stores all the necessary, validated information for the system of the present invention to run. The database stores every template VM 301 that is created by an active agent in clean form following the provisioning and configuration of the VM. Template VMs include all OS, service packs, languages and OS-types defined by the user and are stored to expedite the creation of newly defined VMs later. Logs of all tests and test cases 302, including result logs, screen captures, status information, results (e.g., pass/fail), templates and scripts, are stored for later access. Any applications 303 utilized for testing will be stored in the database, including product, version and OS compatibility information. The agent manager provides agent manager resource information 304 regarding the available resources including hypervisors, status and workflow information so that the queue manager can identify and assign workflows to the appropriate resources.

Figure 4:
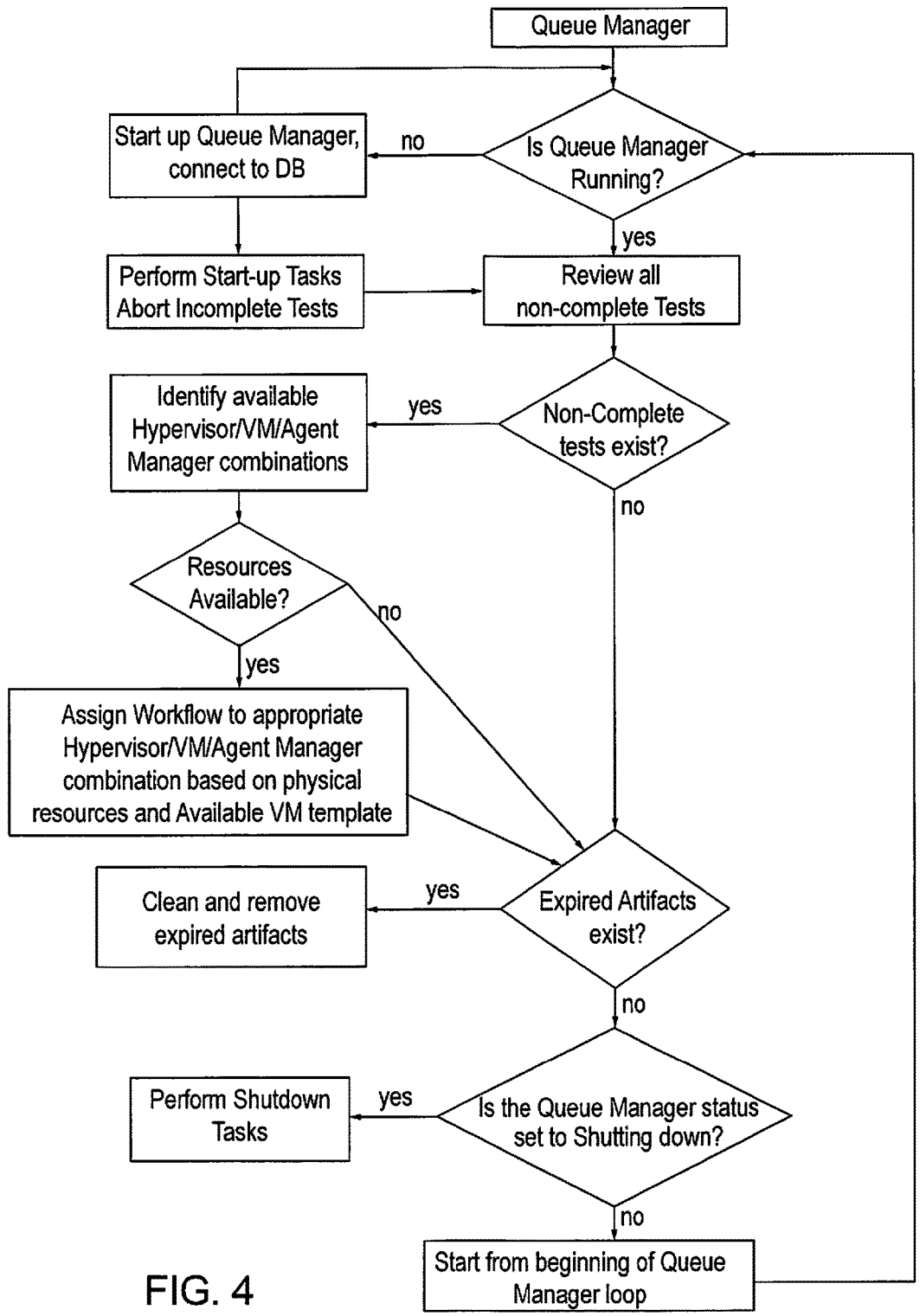
FIG. 4 is an overview of the queue manager, which communicates with the database to queue up workflow assignments for initiation by one or more agent managers.

The queue manager (FIG. 4) is a standalone module that only interacts with the database. The queue manager ascertains, based on available resources, how to most efficiently run all test plan workflows, assign hypervisors, VMs and workflows, and pace the system for optimal efficiency. The queue manager will identify of all currently submitted, active workflows represented in the database and identify and assign resources and manage timing. The queue manager will utilize information stored in database via an agent manager to ascertain what system-wide resources are available for assignment.

The queue manager is equipped to assign workflows based on the availability of resources and set the timing of tests to ensure high efficiency of many tests at any given time. The queue manager will ensure a clean slate is provided if any old artifacts exist in order to manage queuing efficiently. The artifacts will be saved for seven days before removal, and stored in the database and shared drive locations. The queue manager will continuously assign any workflows still in queue, in a continuous loop until all test plans have been completed. If the designated hypervisor/NM combination is not available or is not effective in setup, the test will be returned to the queue manager until available and capable of running.

Figure 5:
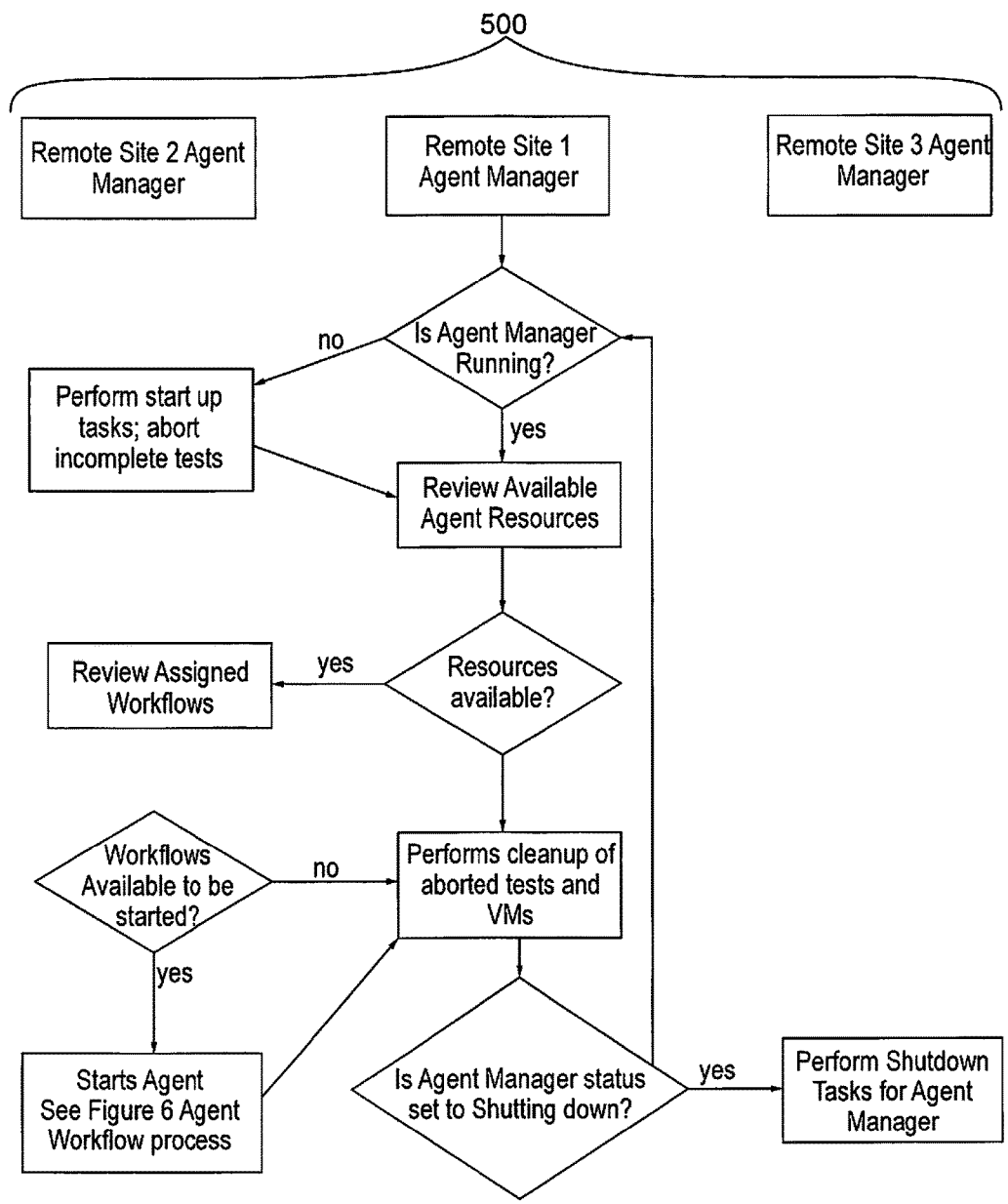
FIG. 5 shows one or more agent managers 500 which review available resources and assign agents to validated workflows or perform cleanup or shutdown activities as needed.
Figure 6:
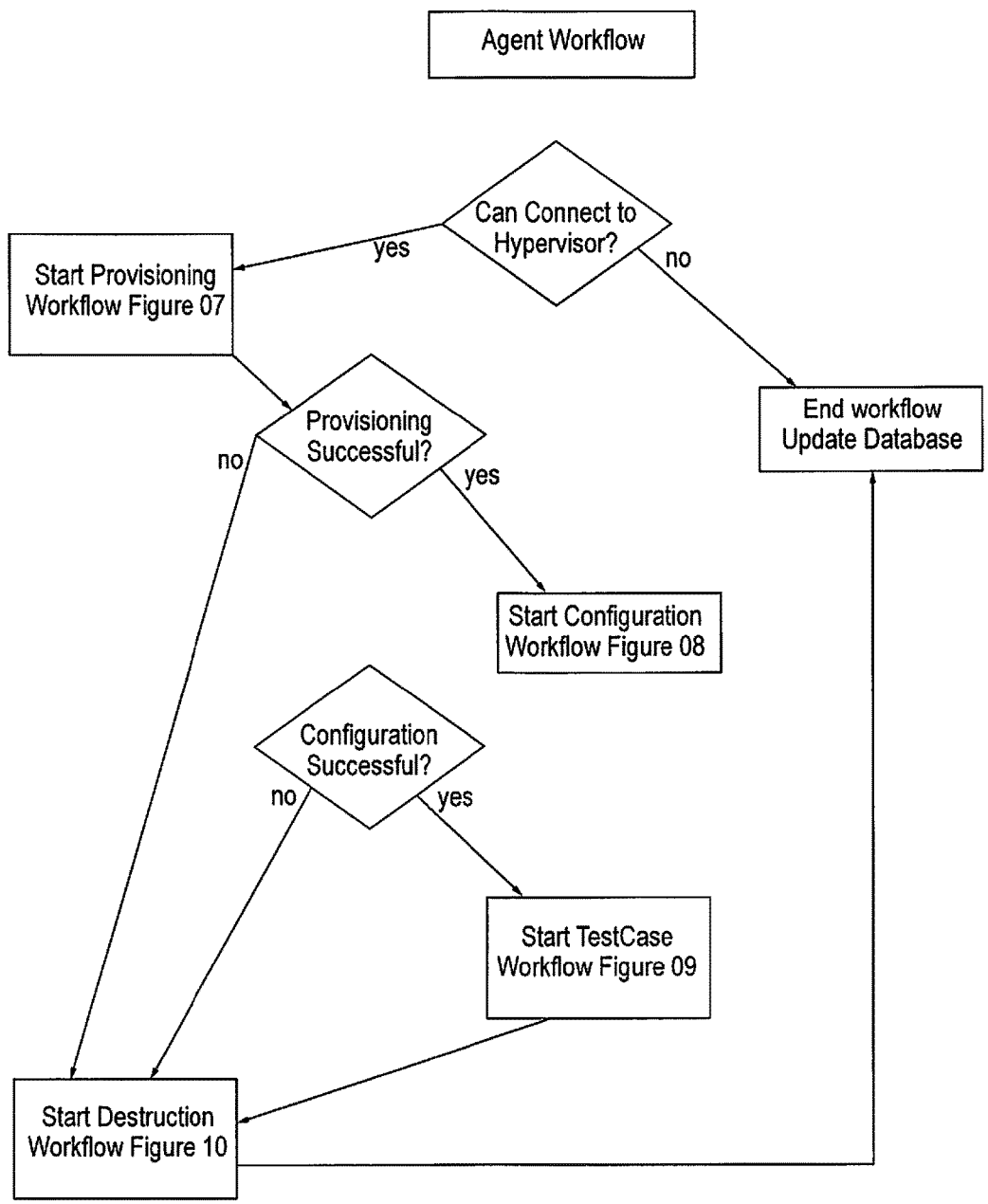
FIG. 6: The agent exists only for the purpose of running the specified workflow and is responsible for completing the automated testing process. The agent workflow consists of the provisioning, configuration, test case execution and VM destruction phases.

FIG. 5 shows one or more agent managers 500, which review assigned workflows and start agents that will run their assigned workflow processes by performing a series of commands and tasks using the hypervisor. The agent managers can exist on the physical location where tests are being conducted with network communication to database. Multiple agents can be created for multiple VMs if the queue manager assigns it. The agent managers update the database on available resources in the remote environment to ensure that appropriate assignments can be made by the queue manager, and remove any abandoned VMs to free up resources and ensure a clean test environment. The agent managers will repeat the process of creating agents for test cases as they are assigned, continuously looping as long as agent workflows (FIG. 6) are designated.

Figure 7:
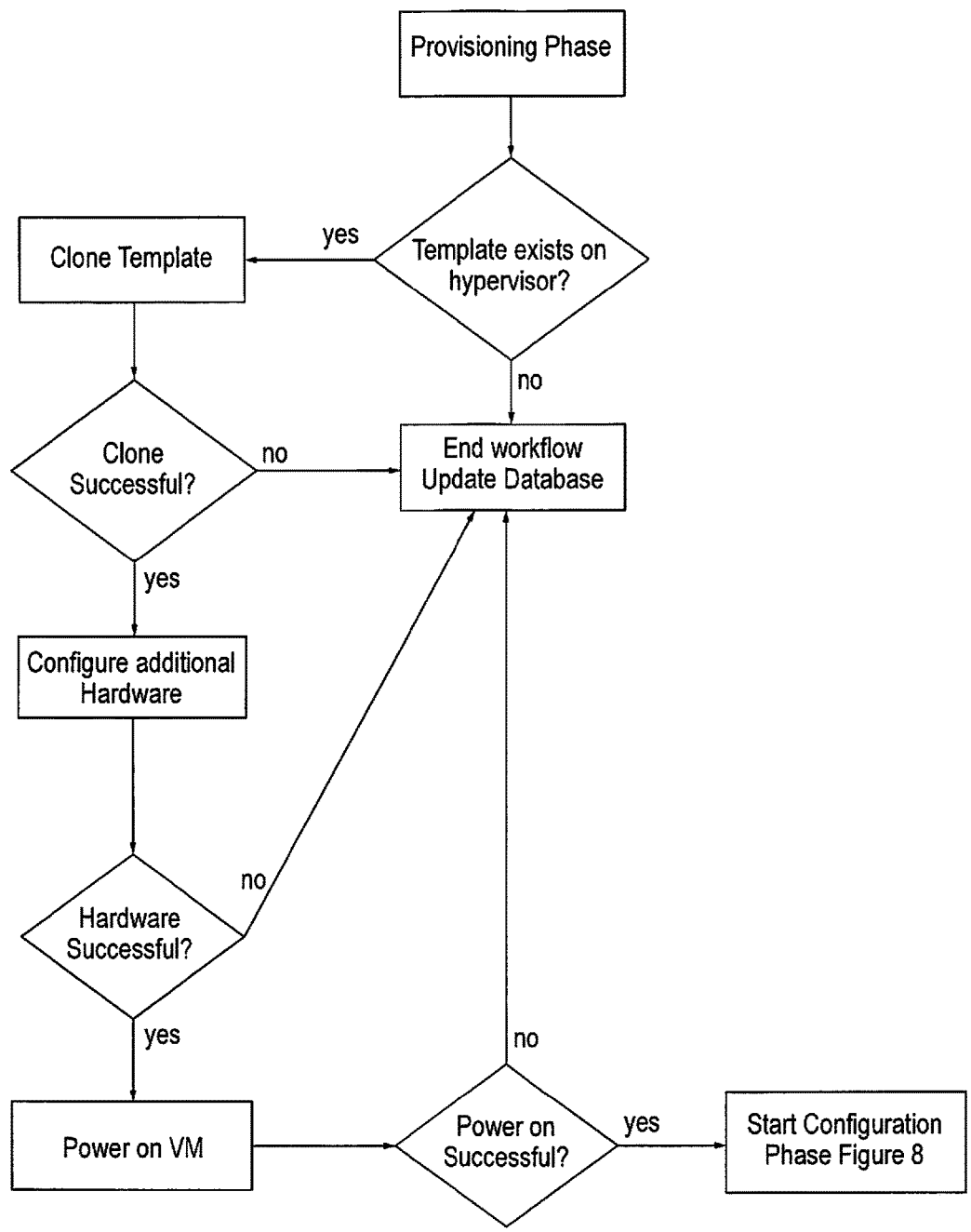
FIG. 7 shows an exemplary provisioning phase, where the simulated environment is designed to replicate the real environment, including memory, drives, and central processing unit (CPU) networks.
Figure 8:
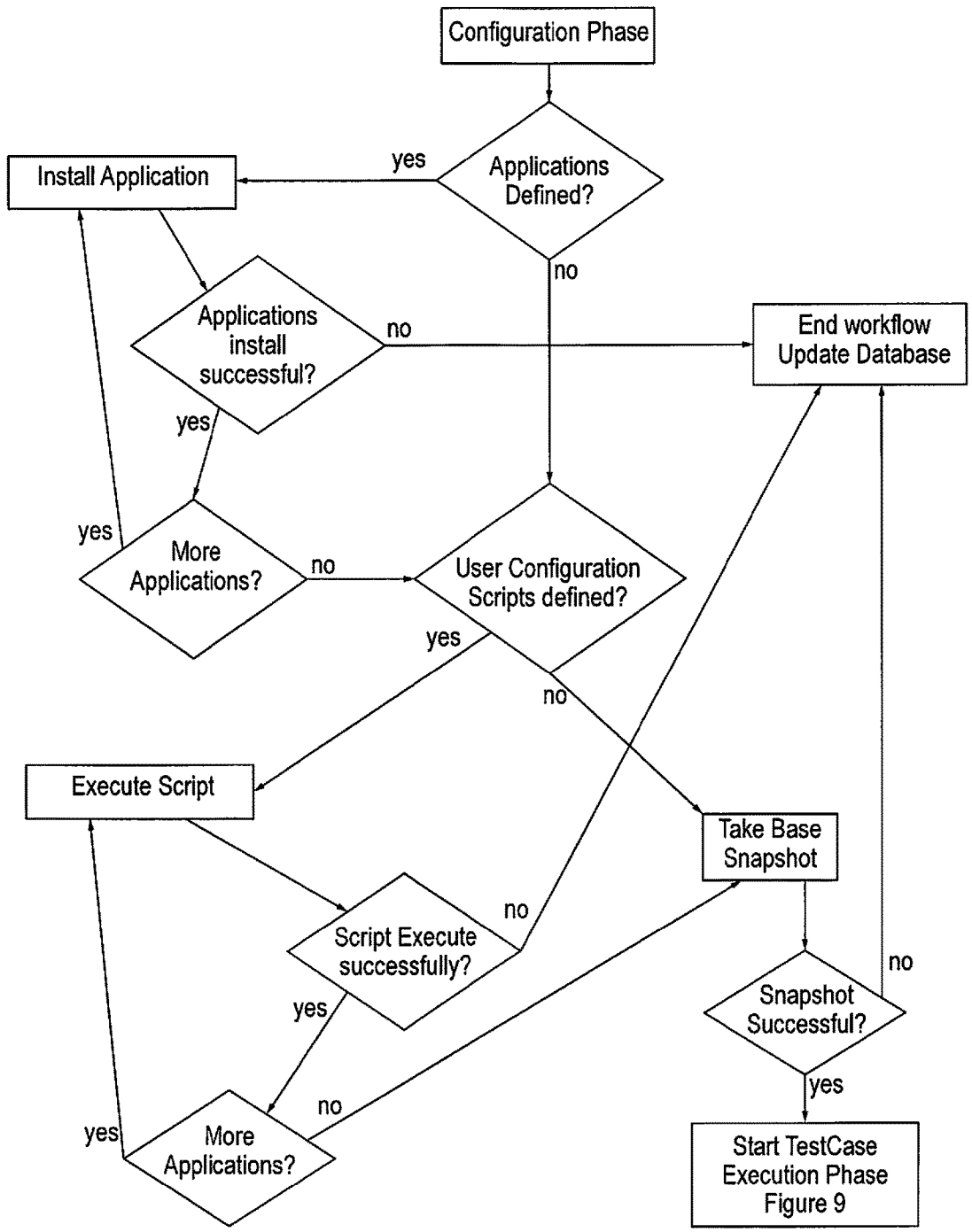
FIG. 8 shows the configuration workflow of the present invention.

Activated agents connect to hypervisors to start provisioning. During the provisioning phase (FIG. 7), existing templates are cloned, additional hardware configured, and available VMs powered on for configuration. The provisioned environment should be an exact replica of the real environment once provisioning is completed. If errors exist it will abort and return errors to the database. Configuration (FIG. 8) is based on user-defined test plans (including applications, scripts, etc.) and will install any and all software applications designated, which exist in the database. If errors exist with configuration it will abort and return error.

Figure 9:
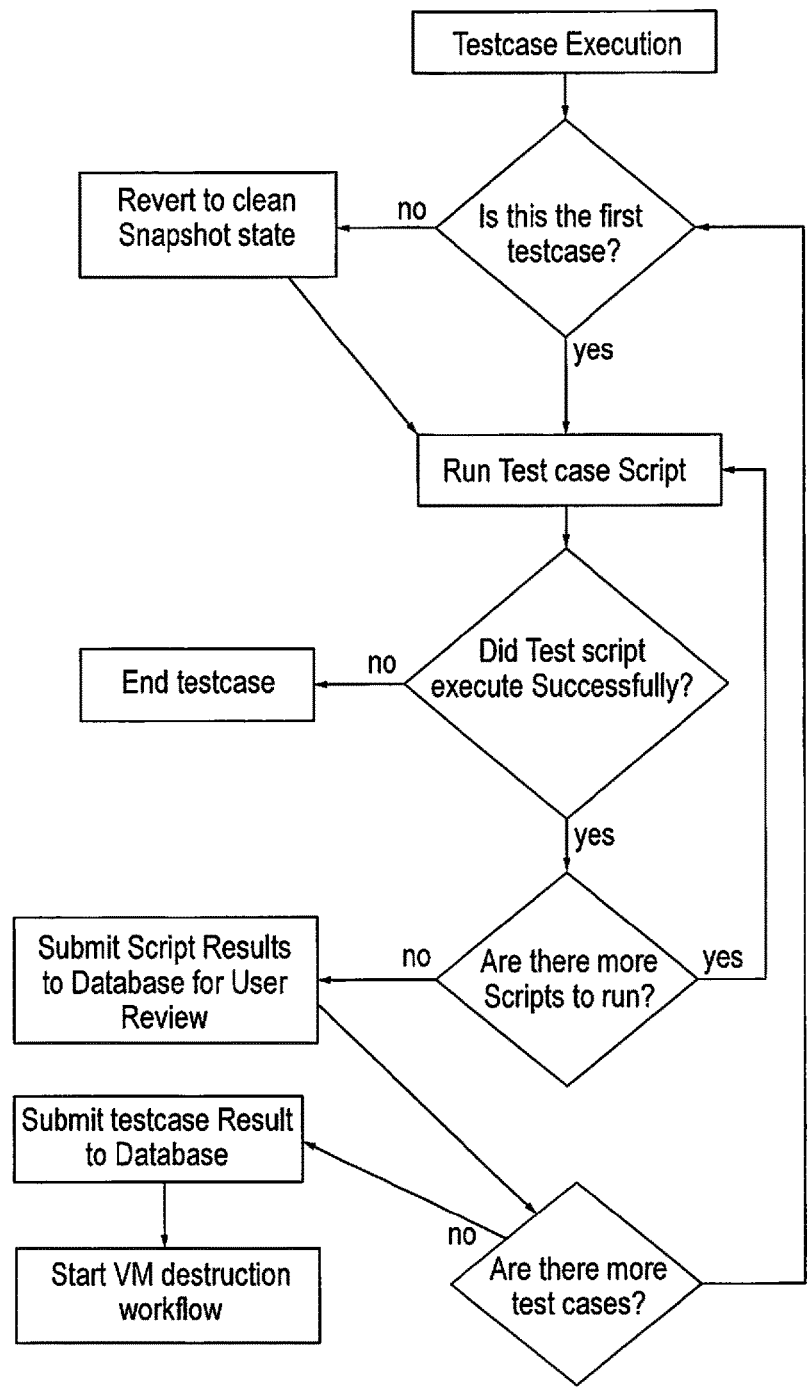
FIG. 9 shows an overview of the testcase execution phase, which is repeatable and cyclical where every defined test case to be run in the test VM environment will be run through until all defined test cases have been exercised in the VM test environment. Throughout execution at each stage screen-capture and results will be retrieved and made available in real time via the GUI. If all test scripts defined in the test plan are completed successfully the test phase will end, or if not, it will revert snapshot to clean state to prepare for further testing.
Figure 10:
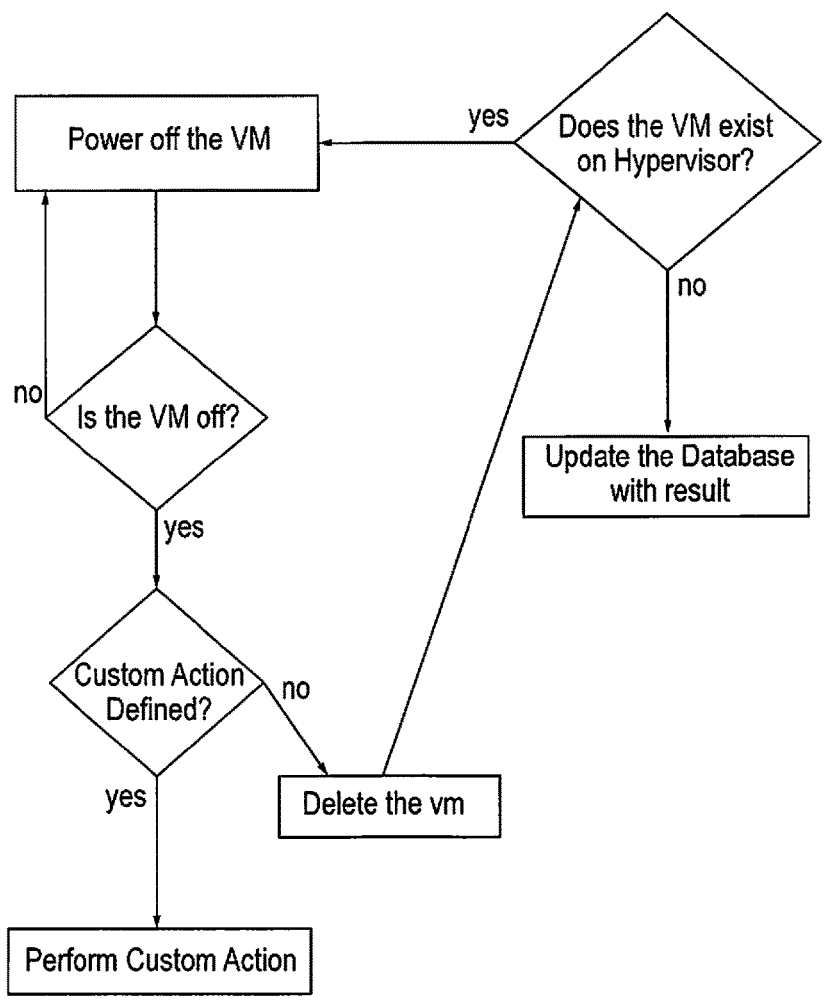
FIG. 10 shows the agent workflow in the event the testcase execution is unsuccessful.

Once all designated applications are installed, defined scripts are executed and a snapshot is taken if no more applications are to be installed as part of the test plan. This is a preliminary test phase that would be predefined in the test plan to run against the test VM environment. Once a snapshot of the fully established template VM is taken, the system can revert to its initial state in the event that it is required for further testing or produces errors. If the snapshot is successful, testcase execution (FIG. 9) begins. If execution is unsuccessful, the agent will destroy the test VM to create available test resources for subsequent tests (FIG. 10). The user can define actions to take to explore what errors were discovered during test execution and determine cause.

Preferred Embodiments

In one embodiment, a system as disclosed herein comprises a hypervisor for provisioning and controlling VMs (defined by a machine configuration in a test plan), an agent for executing pre-test provisioning and one or more test action commands via an application program interface (API) of the hypervisor, and one or more results definitions for gathering and calculating results by the agent. In another embodiment, one or more control scripts are used by the agent for coordinating activities, including but not limited to: a test execution, a clean state snapshot restore, and a log file processing, resulting in a process that is completely extensible and repeatable.

Figure 11:
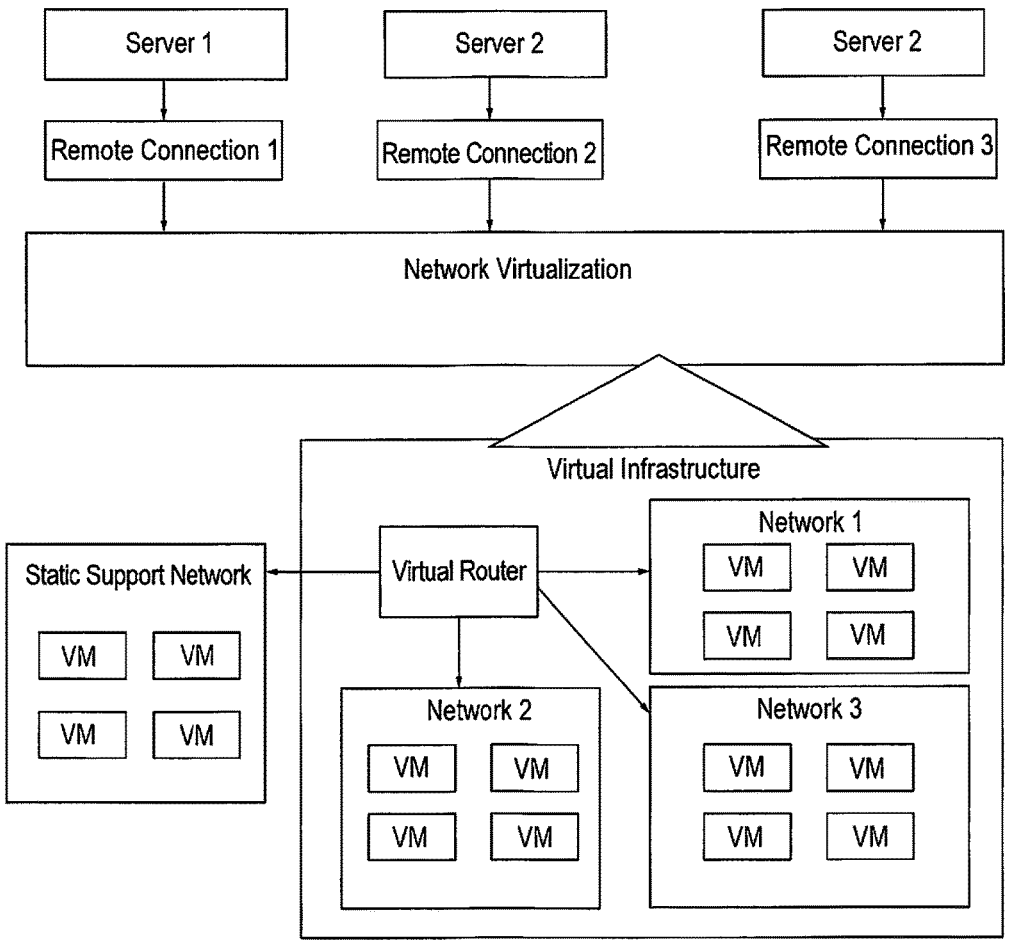
FIG. 11 shows a range test scenario and demonstrates the ability of the invention to be set on a platform that allows for an entirely virtual network to perform a series of range testing capabilities through a virtual router and virtual network environments all performing unique independent functions and supported through a static VM network.
Figure 12:
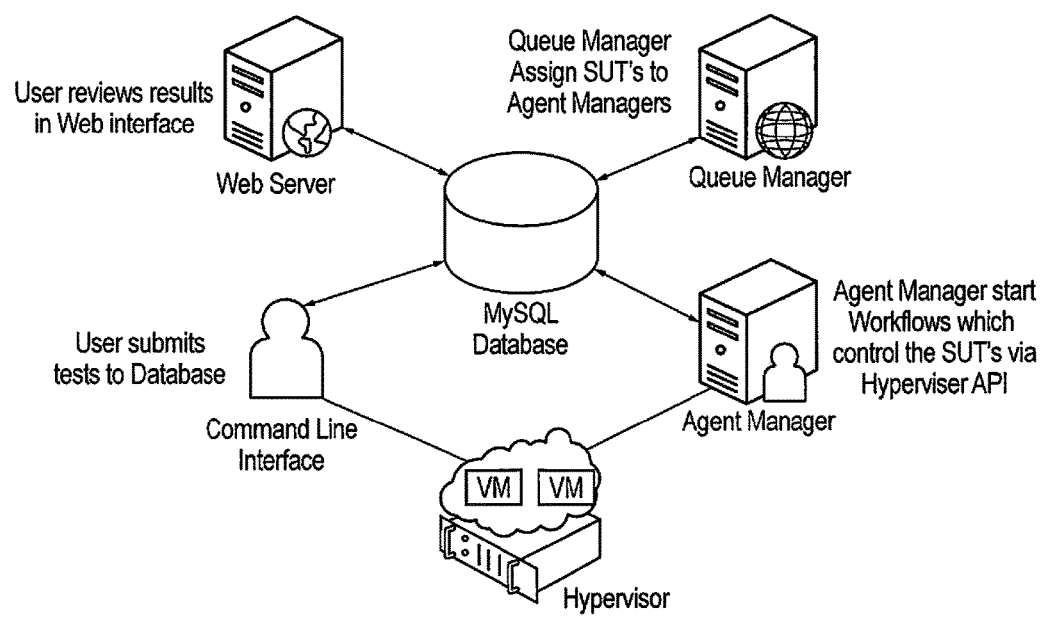
FIG. 12 illustrates an overview of the network operating environment in an embodiment of the present invention as a system with a database interconnected with a web server/processor, queue manager/processor, an agent manager/processor, a hypervisor/virtual machine and command line interface for users to submit tests to the database. The system further comprises one or more input and output devices for user engagement with the system; the input devices may comprise a keyboard, a mouse, and a physical transducer (e.g., a microphone), and the output devices may comprise a display, a printer and a transducer (e.g., a speaker).
Figure 13:
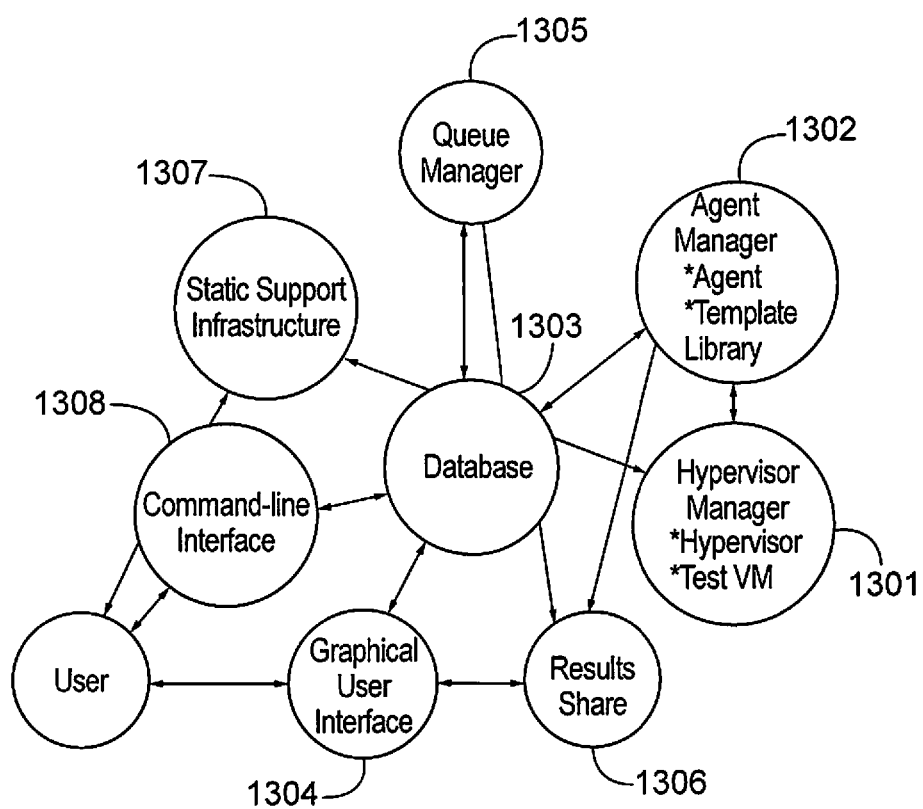
FIG. 13 shows component relationships of the system of the present invention in its preferred embodiments.

The hypervisor is the base of the framework's software stack. Installed directly on the physical server hardware, it provides a basis to run virtualized guest OS. The hypervisor presents the guest OS with a virtual operating platform and manages the execution of the guest operating systems. Multiple instances of OS may share virtualized hardware resources. The hypervisor is where the framework can take advantage of all the hardware resources by running multiple instances of different VMs on the same piece of hardware (see Virtual Infrastructure, FIG. 11). The hypervisor manager 1301 is a service that acts as a central control point for similar hypervisors that are connected on a network. The hypervisor manager 1301 allows the user to pool and manage the resources of multiple hypervisors from one location. The hypervisor manager 1301 provides many features that allow the user to load balance, monitor and manage their physical and virtual infrastructure. The agent manager 1302 queries the database 1303 to gather data that is used in the system's proprietary algorithms to assign tests to an agent and hypervisor combination. The application of these algorithms drives the efficiency of the system in order to improve the speed of the testing cycles. The agent manager 1302 uses an internal API to start an agent that will execute a full test on a single VM from start to finish. The agent manager 1302 is the key component in quickly scaling the invention to hundreds or thousands of concurrent tests.

The agent connects component APIs and manages the workflow of the test plan. Based on the input it receives from the test plan stored in the Database 1303, it transforms the data into a series of rudimentary steps and executes each of those steps. The agent interacts with the hypervisor manager 1301 in order to execute commands on the test VM using guest operations. At the end of each test it gathers and parses the results files to determine the success of the test. Once the test is completed, and the VM is destroyed, it returns the results to the GUI 1304 for the developer to review. A centralized template library is located on shared storage between the hypervisors, and acts as a repository of OS used to fulfill the requested machine configuration requests. A template is a master copy of a VM that is used to create and provision multiple test VMs. Templates are a time saver compared to the alternative of manually loading OS from media or network boots (PXE).

The system can configure and install software on a single VM and clone it multiple times, rather than creating and configuring each VM individually. The database 1303 houses all of the system's artifact metadata. This metadata describes all of the available template VM and application combinations available for testing. It also contains data that outlines which hypervisors are able to run specific template VMs. The database 1303 also contains all of the result data including paths to log files, screen shots, colors for results, and error messages. Lastly it contains the metadata of the available workflows, test plans, agents, agent managers 1302 and the operational status of each of those components. The queue manager 1305 is an independent component that queries the database 1303 and reviews all submitted test plans. It uses proprietary algorithms to assign the test plans to agent managers 1302 based on business rules that can be defined by the software development organization.

Results share 1306 is a data repository where all test artifacts, test logs and system management logs are stored. They can be viewed and downloaded from the GUI 1304 (or the command line interface, if GUI is not selected by the user as the preferred interface). The metadata of these files are automatically stored in the database 1303. Infrastructure management machines provide static support infrastructure 1307 capabilities to the testing environment. This allows the development team to recreate any environment in which their software will be used in the field. Support machines will include a domain name server (DNS) for resolving domain names, a dynamic host configuration protocol (DHCP) server to hand out internet protocol (IP) addresses to test VMs, and shared drives to house test artifacts such as executables and test scripts. The integration of the support machines allows the test to remain automated and repeatable; it removes human error and saves cost.

The GUI 1304 utilizes windows, icons and menus, which can be manipulated by a developer to build the test plan. Its goal is to enhance the efficiency and ease of use for the underlying logical design of a test plan. At the completion of the test plan the test results are displayed back to a GUI 1304 for the developer to review. The results can include color-coded (pass/fail) results, log files, screenshots and other artifacts that the developer defines in the test plan, and all of this data is retrieved from metadata that resides in the database 1303. VM guest operations control the ability to interact with files and programs inside a VM's guest operating system. The agent executes commands destined for the test VM by exposing the API of the hypervisor manager 1301. The command is sent from the hypervisor manager 1301 to the guest operations agent running on the test VM. The agent is able specify folders, files, programs, or users to interact with, allowing full control of the testing environment. Guest operations allow the agent to retrieve log files, screenshots, and other test artifacts that determine the success of the requested application test. A command line interface 1308 provides a way to submit tests in an automated fashion from continuous integration tools like Jenkins or Bamboo. Through the command line interfaces users can also retrieve results and test plan status.

Figure 15:
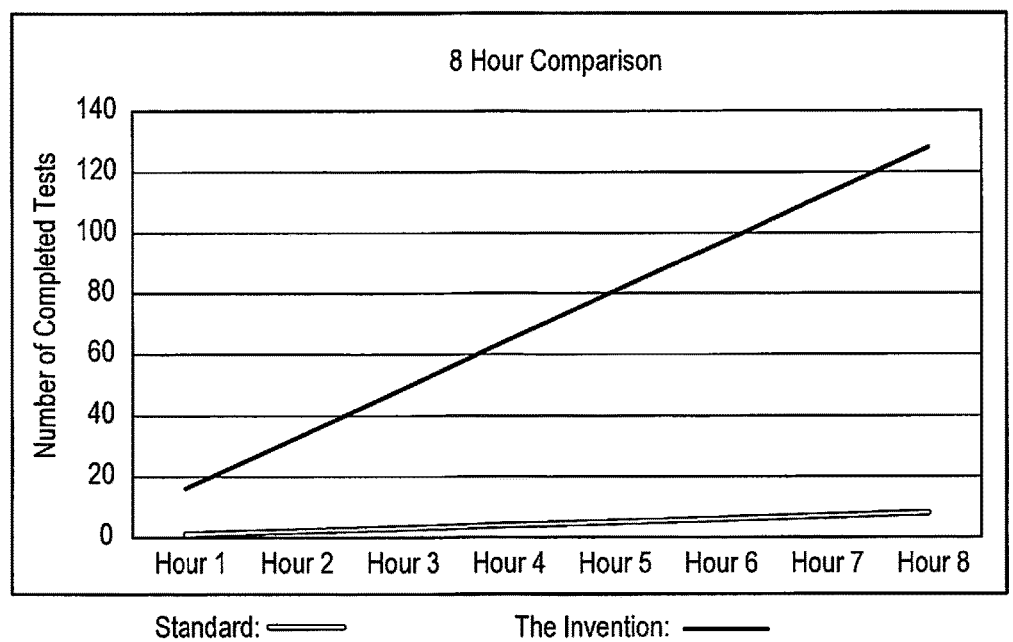
FIG. 15 shows a comparison of the technical efficiency created by the invention—an increase in the number of completed tests performed over an 8-hour period. The invention provides a significant technical benefit over standard processes.

In another embodiment, the system is configured to execute tests simultaneously and in parallel, thereby providing efficient identification of defects and immediate bug fixes. The technical efficiencies and advancements of technology created by the invention include the elimination of human error from the testing process, increasing the frequency and rapidity of the testing, improving consistency, and automatically recording and trending test results to improve insight into defect rates and software development methodology effectiveness. The present invention results in a dramatic increase of test throughput by 800% or more for an unlimited number of OS, depending on physical resources of the host servers, as depicted in FIG. 15.

Figure 14:
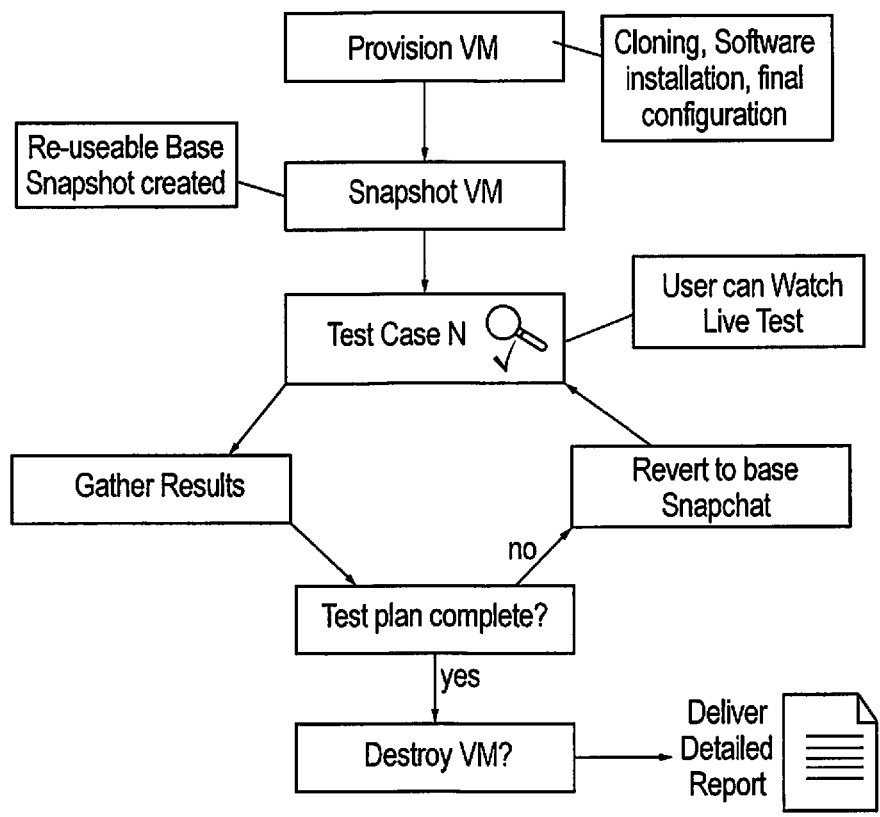
FIG. 14 illustrates that a snapshot of a VM can be imaged upon provisioning and configuration, and may be reused for subsequent tests once an initial test is run and its artifacts destroyed. This can all be done after results of the initial test are delivered to the user.

The snapshot is a key component, saving time on every test and guaranteeing a known starting state for each test. The user defines and starts the test in a GUI. The test plan is sent to the agent where it is transformed into executable steps. The agent starts the provisioning phase of the test, and clones the VM from the centralized template library (FIG. 14). The clone is powered on and configured based on the test plan, with any additional software or user-defined configurations. After provisioning is complete, the agent takes a base snapshot of the configured VM for subsequent test cases. Following the steps defined in the test plan, the agent completes the initial test case, gathers the result files, determines the success of the test, and stores the results. At the end of each test case it automatically restores the system to the base snapshot, destroying all associations with the artifacts from the initial test case. Once the snapshot is restored, it commences the nest test case. The process of reverting the snapshot, executing test cases, and gathering results is repeated until all test cases are completed. At the end of each test case the user will be able to view the results in the GUI. This achieves rapid throughput of multiple tests according to user-defined test plans.

Exemplary System Framework

In one embodiment, a system comprises: a user-defined test plan, an agent manager (module), a queue manager (module), a hypervisor (module), a database, and one or more servers, wherein the system is configured for software provisioning and regression testing comprising executing the user-defined test plan, store data, conduct queries, process tests, queue test results, and display test results in a consumable manner.

In one embodiment, exemplary components of the overall system and method include, but are not limited to: hardware comprising a central processing unit (CPU) with a minimum speed of 2.5 gigahertz, at least 4 gigabytes of memory, hard drive space of a minimum 40 gigabytes; an OS; one or more software modules; VM-ware deployment configured to ensure that one or more test VMs are able to connect to the underlying network, update a hypervisor table, and communicate with servers; and one or more plug-ins.

In one embodiment, a hypervisor of the invention is the base of the framework's software stack. Installed directly on the physical server hardware it provides a basis to run virtualized guest OS. The hypervisor presents the guest OS with a virtual operating platform and manages the execution of the guest OS. Multiple instances of OS may share virtualized hardware resources. The hypervisor is where the framework can take advantage of all the hardware resources by running multiple instances of different VMs on the same piece of hardware. The system of the present invention is configured to utilize multiple vendor hypervisors.

In one embodiment, a hypervisor manager of the invention is a service that acts as a central control point for similar hypervisors that are connected on a network. The hypervisor manager allows the user to pool and manage the resources of multiple hypervisors from one location. The hypervisor manager provides many features that allow the user to load-balance, monitor and manage their physical and virtual infrastructure. The system of the present invention utilizes the following features of the hypervisor manager: cloning, snapshots, and guest operations.

In one embodiment, an agent manager of the invention queries a database to gather data that is used by algorithms of the system to assign tests to an agent and hypervisor combination. The application of these algorithms drives the efficiency of the system in order to improve the speed of the testing cycles. An agent manager can be one of many in system deployment; the agent manager uses an internal API to start an agent that will execute a full test plan on a single VM from start to finish, and is the key component to quickly scale to hundreds or thousands of concurrent tests.

In one embodiment, an agent of the invention is configured for connecting component APIs and managing the workflow of the test plan. Based on the input it receives from the test plan stored in the database, the agent transforms the data into a series of rudimentary steps and executes each of those steps. The agent interacts with the hypervisor manager in order to execute commands on the test VM using guest operations. At the end of each test it gathers and parses the results files to determine the success of the test. Once the test is completed and the VM is destroyed, the agent returns the results to the GUI for the developer to review.

In one embodiment, a centralized template library of the invention is located on shared storage between the hypervisors, and acts as a repository of OS used to fulfill the requested machine configuration requests. A template is a master copy of a VM that is used to create and provision multiple test VMs. Templates are a time saver compared to the alternative of manually loading OS from media or network boots (PXE). The system of the present invention is configured to install software on a single VM and clone it multiple times, rather than creating and configuring each VM individually.

In one embodiment, a database of the invention is a data warehouse for all the system's artifact metadata. This metadata describes all of the available template VMs and application combinations available for testing. It also contains data that outlines which hypervisors can run specific template VMs. The database also contains all the result data including paths to log files, screen shots, colors for results, and error messages. Lastly it contains the metadata of the available workflows, test plans, agents, agent managers and the operational status of each of those components.

In one embodiment, a queue manager of the invention is an independent component that queries the database and automatically reviews all submitted test plans. It uses proprietary algorithms to assign the test plans to agent managers based on business rules that can be defined by the software development organization.

In one embodiment, a results-share data repository of the invention stores all test artifacts, test logs and system management logs. They can be viewed and downloaded from the system GUI and via the command line interface. The metadata of these files are stored in the database.

Exemplary Process for Software Testing

In one embodiment, a process for provisioning and regression testing of a software application includes, but is not limited to, multiple applications, GUIs and software packages, wherein testing occurs simultaneously, with significantly reduced testing and development cycle times, comprises a test plan. This also includes the provisioning of a plurality of VMs; configuring the plurality of VMs; performing a base snapshot; executing an iterative test case, until the software application is verified; and finally, destroying the plurality of VMs upon verification of the software application.

In one embodiment, a test plan is initiated and a VM provisions the test environment, configures the environment by installing the defined software application, and creates a snapshot of the environment. This allows the environment to return to a clean state and the testing phase initiates a series of defined steps, the results are generated from the testing and are gathered, and an assessment is made to determine if the steps pass a threshold for verification. If unable to verify, then further steps are performed until the threshold for verification is achieved. This then signals the completion of the testing phase, after which a log comprising snapshots of the stages of testing is stored and provided by way of a GUI to an end user. The VM then self-destructs.

Performance Benefits: The invention enables a previously unachievable goal of an integrated and automated provisioning and testing environment. Overall, dramatic performance efficiencies are achieved by allowing tests to run constantly and unabated, as opposed to the traditional manual testing, which is restricted by human work hours. Based on the limited multiple-server scenario, for example, in a one work-week period a manual tester would complete approximately 40 tests (one per hour) while the automated invention completes 640 tests without introducing human error. The increase of infrastructure requirements exponentially increases the number of tests performed by the invention.

Table 1 compares standard completion times vs the invention completion times for each stage of the testing process. Provisioning is defined as the configuration of the machine under test, to include loading the OS, installing software and performing other configurations to prepare the machine for testing. Reverting the snapshot is only available to the automated tester and reverts the VM back to the base snapshot as defined by the provisioning phase. The testing phase includes any GUI or code-driven testing to be completed on the test machine. Lastly the results are defined as collecting all of the test artifacts from the test machine, determining pass or failure, and saving the test artifacts in an organized manner for review by interested parties.

TABLE 1

Estimated Times for Benchmark Baselines*

| Method | Provisioning | Revert Snapshot | Testing | Results |
|---|---|---|---|---|
| Standard | 60 minutes | Not Available* | 20 minutes | 10 minutes |
| Invention | 15 minutes | 5 minutes | 10 minutes | 5 minutes |

*The numbers provided in the chart above assume that "manual" testing is being performed on a typical desktop computer, not a virtualized machine and that snapshotting is not available.

Technology Risks: The largest challenge to all software testing environments is the ability to replicate the operational or production environment. However, the invention creates and mimics it faithfully by creating new VM's for every test event. Traditional software testing faces the risk of becoming obsolete with the introduction of new OS and the development of new software languages into the production environment. However, the inherent extensibility of the invention means developers will be able to quickly add VM images to the library of VMs without losing backwards compatibility. The flexibility built into the invention allows the developer to quickly adjust machine configurations and test plans and redefine the result expectations.

Underlying Theory and Application: The effectiveness of this concept is based on the single framework architecture design that allows the seamless integration of multiple capabilities through services that use interfaces, independent of the specific nature of the capability inherently embedded into yet hidden behind them. New capabilities can be added and existing ones updated with minimal disturbance.

It will be clear to a person skilled in the art that features disclosed in relation to any of the embodiments disclosed above can be applicable interchangeably between the different embodiments. The embodiments disclosed above are examples to illustrate various features of the invention.

What is claimed is:

1. A system having a processor for automated provisioning and regression testing of software applications, the system comprising:
a computing device in communication with at least one server and configured with a user interface selected from the group consisting of a graphical user interface and a command line interface;
at least one queue manager tangibly stored on the at least server, the queue manager comprising computer program instructions, which when executed by the processor cause the processor to:
validate test data received from the user interface;
ensure all physical hardware is efficiently used by tracking each running virtual machine hosted by each hypervisor and determining whether a hypervisor can run additional tests based on available hardware resources;
ensure that each agent manager is efficiently used by tracking the number of running workflows per agent manager and determining whether more workflows can be assigned;
review newly canceled tests to ensure that all virtual machines running those tests are aborted to prevent unnecessary load on a hypervisor;
ensure that once all virtual machines have completed their workflows that the tests they were running are marked as complete; and
ensure that a virtual machine template is available on a hypervisor before assigning the workflow to an agent manager;
at least one agent manager tangibly stored on the at least one server, the agent manager comprising computer program instructions, which when executed by a processor cause the processor to:
review any workflows that are assigned to itself and ensure that it has availability and physical resources to run each assigned workflow;
initiate an agent to execute each assigned workflow;
upon shutdown of the agent manager, abort any running workflows, and requeue assigned workflows; and
at least one hypervisor tangibly stored on the at least one server, the at least one hypervisor hosting at least one virtual machine;
wherein each agent at least one agent comprises computer program instructions, which when executed by the processor cause the processor to:
execute its assigned workflow;
connect to the hypervisor specified in the assigned workflow;
ensure a virtual machine is available on the specified hypervisor;
execute the instructions provided in the assigned workflow;
report test details to a database tangibly stored on the at least one server; and
interact with the hypervisor and virtual machine to complete the assigned workflow.

2. The system of claim 1, wherein the database comprises queue manager information, agent manager information, hypervisor information, virtual machine template information and software application information, wherein:

the queue manager information comprises status and interval time information for tests running on the system;

the agent manager information comprises maximum workflow, status and interval wait time information;

the hypervisor information comprises username, password, Internet protocol address, maximum workflow, virtual machine template information, datastores, and hypervisor type information;

the virtual machine template information comprises username, password and operating system information; and the software application information comprises software name, version and supported operating systems information.

3. A method of automating the provisioning and testing of at least one software application using the system of claim 2, the method comprising:

defining at least one operating system on which the software application can be installed and operate;

installing the at least one operating system on at least one physical or virtual machine to create a test environment;

populating a database with data defining test parameters and success criteria for testing the software application;

performing the test to determine if the software application meets the success criteria; and upon such determination, removing the test environment if the success criteria are met or if not, performing the test recursively until the success criteria or met.

* * * * *